(12) United States Patent
Nakajima et al.

(10) Patent No.: US 7,159,582 B2
(45) Date of Patent: Jan. 9, 2007

(54) BLOWBY CONTROL SYSTEM AND METHOD FOR AN INTERNAL COMBUSTION ENGINE

(75) Inventors: Hiroyuki Nakajima, Saitama (JP); Yuuki Muraoka, Saitama (JP); Nobuhiro Shimada, Saitama (JP); Ryuji Moriyama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 272 days.

(21) Appl. No.: 10/950,162

(22) Filed: Sep. 24, 2004

(65) Prior Publication Data

US 2005/0090371 A1   Apr. 28, 2005

(30) Foreign Application Priority Data

Oct. 3, 2003  (JP) ............................. 2003-346155

(51) Int. Cl.
*F01M 13/00*  (2006.01)
(52) U.S. Cl. ........................................... 123/572
(58) Field of Classification Search ........ 123/572–574, 123/41.86
See application file for complete search history.

(56) References Cited

U.S. PATENT DOCUMENTS

| | | | | |
|---|---|---|---|---|
| 3,589,347 A | * | 6/1971 | Sawada | 123/574 |
| 4,136,650 A | * | 1/1979 | Manookian, Jr. | 123/573 |
| 4,535,732 A | * | 8/1985 | Nakano et al. | 123/90.16 |
| 4,856,487 A | * | 8/1989 | Furuya | 123/574 |
| 5,542,401 A | * | 8/1996 | Newarski | 123/572 |
| 5,586,996 A | * | 12/1996 | Manookian, Jr. | 55/321 |
| 6,247,464 B1 | | 6/2001 | Maegawa et al. | |
| 6,298,836 B1 | * | 10/2001 | Werner | 123/572 |

FOREIGN PATENT DOCUMENTS

| | | |
|---|---|---|
| EP | 0180918 | 5/1986 |
| EP | 0703355 | 3/1996 |
| EP | 0291358 | 11/1998 |
| GB | 1426398 | 2/1976 |
| JP | 09068028 A | 3/1997 |

* cited by examiner

*Primary Examiner*—Marguerite McMahon
(74) *Attorney, Agent, or Firm*—Carrier, Blackman & Associates, P.C.; William D. Blackman; Joseph P. Carrier

(57) ABSTRACT

In an internal combustion engine for a vehicle having a drive clutch, a blowby control system includes a fresh air introducing channel, for introducing fresh air into a crankcase, and a blowby gas return channel for returning blowby gas from the crankcase to an air-intake system. A blowby control valve is provided in the fresh air introducing channel or the blowby gas return channel, for selectively restricting gas flow through the blowby system. A controller is also provided on the vehicle for controlling operation of the blowby control valve. The controller is programmed to switch the blowby control valve from the closed state to the open state, with the drive clutch connected, when the vehicle starts traveling. The blowby control system and method hereof can reduce variations in the engine speed occurring during engine idling and before clutch engagement, to improve ride quality of the vehicle.

14 Claims, 5 Drawing Sheets

BLOWBY CONTROL SYSTEM AND METHOD FOR AN INTERNAL COMBUSTION ENGINE

CROSS-REFERENCE TO RELATED APPLICATIONS

The present invention claims priority under 35 USC 119 based on Japanese patent application No. 2003-346155, filed Oct. 3, 2003.

BACKGROUND OF THE INVENTION

1. Field of the Invention

The present invention relates to internal combustion engines. More particularly, the present invention relates to a blowby control system and method for an internal combustion engine on a vehicle.

2. Description of the Background Art

Internal combustion engines are used for many applications today, and are particularly useful as vehicular power sources. A number of known systems have been proposed to cope with blowby gases, caused primarily by air bypassing the compression rings. Many vehicles are equipped with positive crankcase ventilation (PCV) systems as standard equipment, to help manage blowby gases.

In an internal combustion engine in which blowby gas from a crankcase is not discharged outside of the engine, but instead, is returned to a combustion chamber from an air-intake channel via a breather channel and is then burned, there is an example of a known approach in which a solenoid valve is interposed in the breather channel. (see, for example, Japanese Published Patent Document JP-A-9-68028).

In the system disclosed in this reference, the breather channel is closed during deceleration when the intake vacuum increases to an abnormally high level, for limiting suction of the blowby gas into the combustion chamber.

Therefore, since the blowby gas is drawn into the combustion chamber by a significant air-intake negative pressure with the throttle valve closed or throttled, when a vehicle starts traveling, the engine speed varies due to the combustion of HC mixed in the blowby gas. In particular, in a vehicle having a drive clutch, variations in the engine speed affect the feeling of engagement of the clutch before the clutch is fully engaged.

Although the known blowby control systems are usable for their intended purposes, a need still exists in the art for an improved blowby control system and method. In particular, there is a need for an improved blowby control system and method which will overcome the difficulties encountered with the known art.

SUMMARY OF THE INVENTION

In view of such points, it is an object of the present invention to provide a blowby control system and method for an internal combustion engine in which variations in engine speed before connecting the clutch are reduced, to improve ride quality.

In order to achieve the aforementioned object, a first embodiment of the invention provides a blowby control system for an internal combustion engine to be mounted on a vehicle having a drive clutch, where the engine includes a crankcase and an air-intake system. The blowby control system according to the first embodiment includes a fresh air introducing channel for introducing fresh air into the crankcase, and a blowby gas return channel for returning blowby gas in the crankcase to an air-intake system. The blowby control system according to the first embodiment also includes a blowby control valve provided in the fresh air introducing channel or in the blowby gas returning channel for opening and closing the channel. The blowby control system according to the first embodiment also includes an electronic controller for controlling operation of the blowby control valve, wherein the controller is operable to switch the blowby control valve from the closed state to the opened state, with the drive clutch connected, when the vehicle starts traveling.

Since the blowby control valve is switched from the closed state to the opened state with the drive clutch connected when the vehicle starts traveling, the blowby control valve is closed and the channel is blocked before the drive clutch is connected, so that the blowby gas is not drawn into the combustion chamber more than necessary, even when the intake vacuum is high. As a result, combustion is hardly affected by the blowby gas, and hence variations in the engine speed can be reduced to improve ride quality.

Since the channel is closed in the idling state after having started the engine, variations in the idle speed are minimized.

Since the blowby control valve is opened with the drive clutch connected, when the vehicle starts traveling thereafter, combustion is hardly affected by the blowby gas, and hence, the engine speed can be controlled without significant variation.

In addition to the blowby control system for an internal combustion engine according to the first embodiment hereof, the invention according to a second embodiment is characterized in that the controller determines the operational state of the drive clutch based on the engine speed.

Since the drive clutch is connected when the engine speed exceeds a certain level, the connecting state of the drive clutch, for controlling the blowby control valve, is determined based on the rotary speed of the internal combustion engine.

In addition to the blowby control system for an internal combustion engine according to the second embodiment hereof, the invention according to a third embodiment is characterized in that the controller performs hysteresis control by setting the engine speed for closing the blowby control valve at a lower value than the engine speed for opening the valve.

By opening the blowby control valve at a higher engine speed, switching operation with the drive clutch connected is reliably performed, and by closing the blowby control valve at a lower engine speed, a natural reduction of the engine speed by the inertia force of a crankshaft can be utilized after having disconnected the drive clutch, to prevent the vehicle ride quality from deteriorating. In addition, air ventilation of the crankcase is delayed until the engine speed is reduced to a low level, whereby the reduction capability of the blowby gas is improved.

In addition to the blowby control system for an internal combustion engine according to the first embodiment hereof, the invention according to a fourth embodiment is characterized in that the blowby control valve is a solenoid valve which opens when energized.

Since it is the solenoid valve which opens when energized, and since it is closed when no electricity is distributed thereto in the idling state after having started the engine, an electric load of the solenoid is prevented, and engine friction in association with power generation is also reduced.

In addition to the blowby control system for an internal combustion engine according to the fourth embodiment hereof, the invention according to a fifth embodiment is characterized in that the controller shuts off power to the blowby control valve and closes the solenoid thereof when the engine speed is high.

In the state in which the engine speed is high, increase in blowby gas at high rotation can be prevented by stopping power to, and closing the solenoid valve.

In addition to the blowby control system for an internal combustion engine according to the first embodiment hereof, the invention according to a sixth embodiment is characterized in that a one-way valve is provided in the fresh air introducing channel to ventilate within the crankcase by variations in pressure in the crankcase in association with the reciprocation of the piston. This valve may be a reed valve.

With the provision of the one-way valve in the fresh air introducing channel to ventilate within the crankcase compulsorily by vibrations in pressure in the crankcase in association with the reciprocation of the piston, reduction capability of the blowby gas can be improved.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION

It should be understood that only structures considered necessary for clarifying the present invention are described herein. Other conventional structures, and those of ancillary and auxiliary components of the system, are assumed to be known and understood by those skilled in the art.

Referring now to FIG. 1 to FIG. 5, a selected illustrative embodiment of the present invention will be described.

Figure 1:
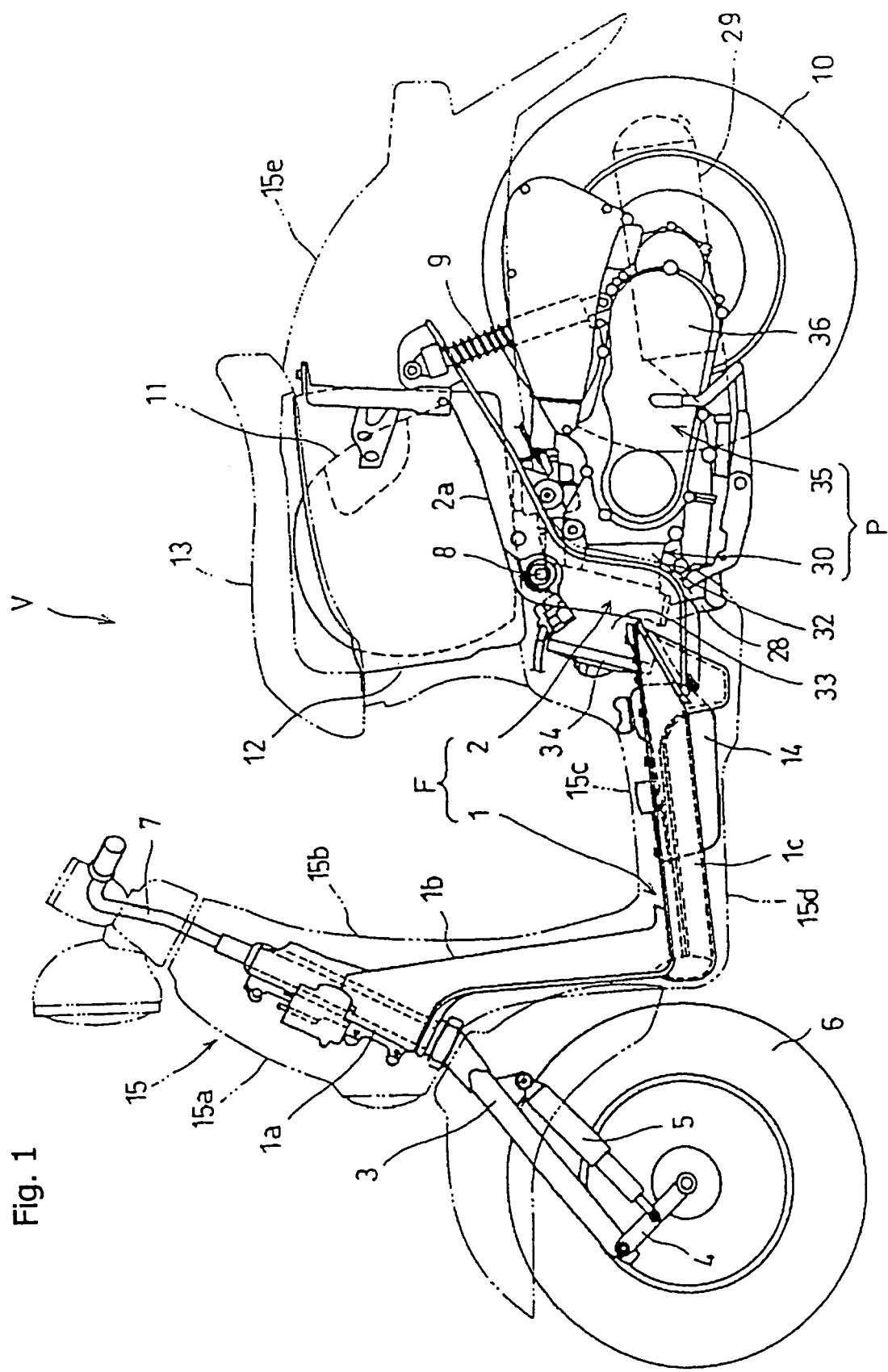
FIG. 1 is a side view of a scooter-type vehicle, incorporating a blowby control system according to an illustrative embodiment of the present invention.

As best seen in FIG. 1, an internal combustion engine 30, to which a selected illustrative embodiment of the present invention is applied, is a four-stroke, single-cylinder spark-ignition engine. The engine 30 is designed and configured to be mounted, as one part of a powertrain unit P, on a two-wheeled scooter-type vehicle V.

The scooter-type vehicle V includes a vehicle body frame F, including a front frame 1 and a rear frame 2. The vehicle V also includes a front fork 3 pivotally supported by a head pipe 1a of the front frame 1, and a front wheel 6 rotatably supported by an arm 4, which is pivotally supported at the lower end of the front fork 3. The vehicle V also includes a front shock absorber 5 connecting the front fork 3 and the arm 4, a handlebar 7 fixed to the upper end of the front fork 3. The powertrain unit P is a swing-type powertrain unit, pivotally supported by a pivot mount 8 provided on the rear frame 2 of the vehicle body frame F.

The vehicle V also includes a rear wheel 10, rotatably supported at the rear end of the powertrain unit P. A rear shock absorber 9 connects a rear portion of the powertrain unit P to the rear frame 2. A storage box 12 is attached to the rear frame 2, for accommodating an article, such as a helmet 11. A seat 13 is pivotally attached to the top of the storage box 12, for covering the opening of the storage box 12 in a manner so as to be capable of opening and closing. A fuel tank 14 is mounted to the front frame 1, and a vehicle body cover 15 is provided for covering the front vehicle frame F.

The vehicle body frame F is a two-piece frame, including the front frame 1 and the rear frame 2 connected to each other with bolts. The front frame 1 includes the head pipe 1a, a down frame 1b extending downward from the head pipe 1a, and a pair of left and right floor supporting frames 1c extending rearward and substantially horizontally from the lower end of the down frame 1b, all formed integrally by casting.

The rear frame 2 includes a pair of left and right main frames 2a, and a plurality of cross members (not shown) connected to both of the main frames 2a, formed integrally with each other by casting. The front ends of the left and right main frames 2a are connected to the rear ends of the left and right floor supporting frames 1c by bolts.

The vehicle body cover 15 includes a front cover 15a for covering the front portion of the head pipe 1a, and a leg shield 15b, for covering the rear portion of the head pipe 1a and the down frame 1b. The leg shield 15b is positioned to protect the front of legs of a driver. The vehicle body cover 15 also includes a step floor 15c for supporting the driver's feet, and an under cover 15d disposed below the step floor 15c. The under cover 15d is provided for covering the left and right floor supporting frames 1c. The vehicle body cover 15 also includes a rear side cover 15e for covering the left and right main frame 2a.

The fuel tank 14 is disposed between the left and right floor supporting frames 1c and in a storage space defined by the step floor 15c and the under cover 15d. Fuel in the fuel tank 14 is pumped by a fuel pump, and is supplied to a carburetor 122 of the internal combustion engine 30 (to be described later).

The powertrain unit P includes a laterally disposed internal combustion engine 30 including a laterally extending crankshaft, and a belt-type stepless transmission 35, for transmitting power from the internal combustion engine 30 to the rear wheel.

Figure 2:
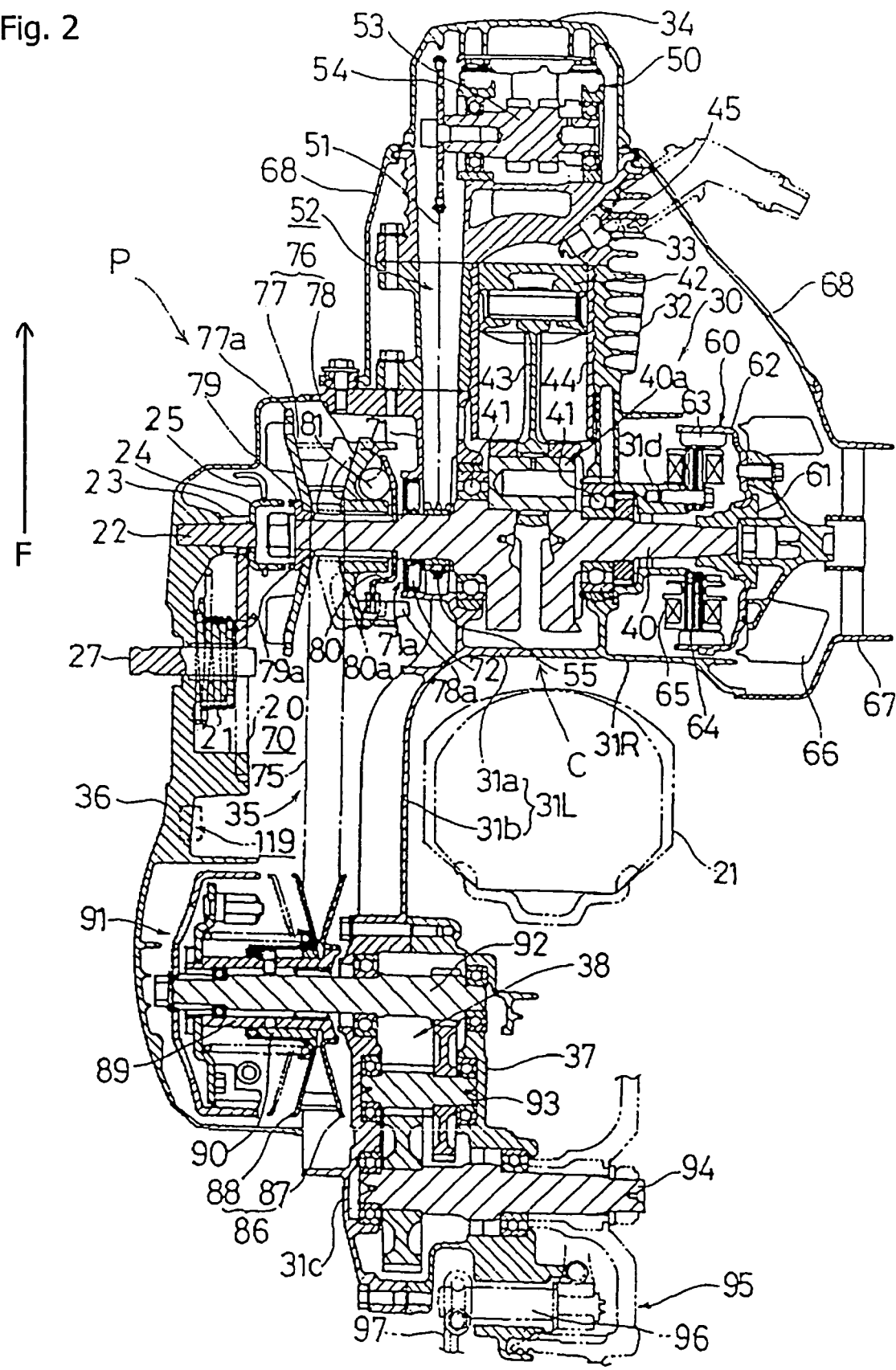
FIG. 2 is a cross-sectional view of a powertrain unit of the scooter-type vehicle of FIG. 1, taken along a horizontal plane.

FIG. 2 is a cross-sectional view of a powertrain unit of the scooter-type vehicle of FIG. 1, taken along a horizontal plane. The arrow drawn above the capital letter F in FIG. 2 is provided for reference, and points toward the front of the vehicle.

As seen in FIG. 2, a unit swing case 31 of the powertrain unit P includes a left unit case 31L and a right unit case 31R, joined together. The right unit case 31R corresponds to a right half of a crankcase C. The left unit case 31L includes a left front crankcase unit 31a, which is elongated in the fore-and-aft direction, a transmission case unit 31b at the center, and a speed reducer case unit 31c at the rear. The crankcase C has a left protruded portion defined inside of the left front crankcase unit 31a, and a right protruded portion inside of the right unit case 31R. A crankshaft 40 is rotatably supported by left and right main bearings 41, 41 in the crankcase C, including the left front crankcase unit 31a and the right unit case 31R.

An opening formed in the left side of the left unit case 31L is covered by a transmission case cover 36, and accommodates the belt-type stepless transmission 35 therein. An opening formed in the right side of the rear speed reducer case unit 31c accommodates a speed-reducing mechanism 38 stored therein, and is covered by a speed reducer case cover 37.

An alternating current (AC) generator 60 is provided in the right protruded portion of the crankcase C, extending horizontally in the lateral direction. A cam-chain drive sprocket 55, and a belt-drive pulley 76 of the belt-type stepless transmission 35, are provided in the left protruded portion of the crankcase C.

The internal combustion engine 30 includes a piston 42 reciprocating inside of a cylinder liner 44 of a cylinder block 32. The piston 42 is connected to a crankpin 40a of the crankshaft 40 by a connecting rod 43.

This four-cycle internal combustion engine 30 employs an OHC type valve system, and includes a valve mechanism 50 in a cylinder head cover 34, and a timing chain 51 extended between a camshaft 53 and the crankshaft 40, for transmitting drive force to the valve mechanism 50. A timing chain chamber 52 is provided therefor, to communicate between the left front crankcase unit 31a, the cylinder block 32, and a cylinder head 33.

In other words, the timing chain 51 is extended, through the timing chain chamber 52, between a driven sprocket 54 fitted on the left end of the camshaft 53 oriented horizontally in the lateral direction and the drive sprocket 55 fitted to the crankshaft 40.

A spark plug 45 is fitted in the cylinder head 33 from the opposite side (right side) of the timing chain chamber 52 toward the combustion chamber.

The AC generator 60, provided inside the right unit case 31R, includes a bowl-shaped outer rotor 62 fixed to the end of the crankshaft 40 projecting from the center cylindrical portion 31d of the right unit case 31R via an ACG boss 61, and a stator 64 having a stator coil 65 wound thereon is fixed to the center cylindrical portion 31d inside a magnet 63 disposed circumferentially on the inner peripheral surface.

A compulsory air-cooling fan 66 is attached to the right side surface of the outer rotor 62, and a fan cover 67 covers the fan, as shown. A fan shroud 68 is provided so as to continue from the fan cover 67 and to cover the periphery of the cylinder block 32 and the cylinder head 33.

On the other hand, the left front crankcase unit 31a of the unit swing case 31 includes the timing chain chamber 52 therein defined by being partitioned by the main bearing 41 from the crank chamber. The left wall of the timing chain chamber 52 corresponds to a partitioning wall 71, which partitions between the belt-type stepless transmission chamber 70 and the timing chain chamber 52 on the left side thereof. The partitioning wall 71 is formed with a circular through-hole 71a, formed into a flat cylindrical shape of a large diameter, through which the crankshaft 40 passes. An annular sealing member 72 is press-fitted into the through-hole 71a, and the crankshaft 40 passes through a hollow portion of the annular sealing member 72.

The drive sprocket 55 is fitted to the crankshaft 40 between the sealing member 72 and the main shaft 41, and the outer diameter of the annular sealing member 72 and the inner diameter of the through-hole 71a are larger than the maximum diameter thereof in a state in which the timing chain 51 is wound around the drive sprocket 55.

Therefore, since the through-hole 71a of a large diameter is opened if the annular sealing member 72 is removed from the through-hole 71a, the timing chain 51 can be removed form the drive sprocket 55 or wound around the same by utilizing the opening.

The belt-type stepless transmission chamber 70 is sealably partitioned from the timing chain chamber 52 by the sealing member 72, so that oil is prevented from leaking into the belt-type stepless transmission chamber 70.

The crankshaft 40 passing through the sealing member 72 and extending therefrom is provided with the belt-drive pulley 76, so as to be capable of rotating.

The belt-drive pulley 76 includes a fixed pulley half 77 and a movable pulley half 78, and the fixed pulley half 77 is fixed to the left end of the crankshaft 40 via a boss 79, and the movable pulley half 78 is spline-fitted to the crankshaft 40 on the right side thereof. The movable pulley half 78 rotates with the crankshaft 40 and slides in the axial direction to move toward and away from the fixed pulley half 77. A V-belt 75 is clamped between the both pulley halves 77, 78 and wound around.

A cam plate 80 is provided at a fixed position which is on the right side of the movable pulley half 78 and close to the annular sealing member 72, and a slide piece 80a provided on the outer peripheral edge thereof is slidably engaging a cam plate sliding boss 78a formed at the outer peripheral edge of the movable pulley half 78 in the axial direction.

The side surface of the movable pulley half 78 on the side of the cam plate 80 is tapered toward the cam plate 80, and a dry weight roller 81 is stored on the inner side of the tapered surface so as to be clamped by the cam plate 80.

Therefore, when the rotational speed of the crankshaft 40 increases, the dry weight roller 81, which is disposed between the movable pulley half 78 and the cam plate 80 and rotates therewith, moves toward the centrifugal direction by a centrifugal force, and the movable pulley half 78 is pressed by the dry weight roller 81 and hence moved leftward toward the fixed pulley half 77, so that the V-belt 75 clamped between the both pulley halves 77, 78 is moved in the centrifugal direction to increase the winding diameter.

A belt-driven pulley 86 on the rear side corresponding to the belt-drive pulley 76 includes both pulley halves 87, 88 and configured in such a manner that the fixed pulley half 87 is fitted to an inner sleeve 89 supported so as to be capable of relative rotation with respect to a speed reducer input shaft 92 of the speed-reducing mechanism 38, and the movable pulley half 88 is fitted to an outer sleeve 90 supported on the left side of the fixed pulley half 87 so as to be capable of sliding in the direction of the axis of the inner sleeve 89.

The V-belt 75 is clamped between the both pulley halves 87, 88.

A centrifugal clutch 91, which corresponds to a drive clutch, is provided on the left side of the speed reducer input shaft 92 and the inner sleeve 89. When the rotational speed thereof increases, the centrifugal clutch 91 joins, and thus a power transmitted via the V-belt 75 to the inner sleeve 89 is transmitted to the speed reducer input shaft 92.

The speed-reducing mechanism 38 reduces the speed of the power transmitted to an output shaft 94 by the speed reducer input shaft 92 by engagement of gears via the intermediate shaft 93, and the output shaft 94 rotates the rear wheel 10 via the axle of the rear wheel 21.

A drum brake 95 is provided at the hub portion of the rear wheel 10, and a drum brake arm 97, to which a brake cable is connected, is fitted to the drum brake shaft 96. When the brake cable is pulled, the drum brake arm 97 swings, and the drum brake shaft 96 is rotated so that the drum brake 95 works.

The power transmission case cover 36, which covers the belt-type stepless transmission chamber 70 from the left side, covers the portion extending from the belt-drive pulley 76 at the front to the centrifugal clutch 91 at the rear. The kick shaft 27 is pivotally passed through and supported by the position thereof slightly forward of the center, and a drive helical gear 20 is fitted on the inner end of the kick shaft 27, and is urged by a return spring 21.

On the front inner surface of the power transmitting case cover 36, a sliding shaft 22 is supported in the crankcase in a manner so as to be rotatable, axially slidable, and coaxially disposed with respect to the crankshaft 40. The sliding shaft 22 is formed with a driven helical gear 23, which engages the drive helical gear 20, a ratchet wheel 24 is fixed to the right end thereof, and a friction spring 25 urges them leftward entirely.

On the other hand, the boss 79 on the side of the crankshaft 40 includes a ratchet 79a formed so as to oppose the ratchet wheel 24, and both of them can come into and out of contact with each other by sliding movement of the sliding shaft 22.

Therefore, when a kick pedal (not shown) is pressed down, and the kick shaft 27 rotates against the return spring 21, the drive helical gear 20 rotates integrally with the kick shaft 27, and the driven helical gear 23 engaging therewith rotates integrally with the sliding shaft 22 and simultaneously slides rightward against the friction spring 25, so that the ratchet wheel 24 engages the ratchet 79a of the boss 79 to force the crankshaft 40 to rotate, thereby starting the internal combustion engine 30.

On the other hand, the internal combustion engine 30 includes a starter motor disposed above the left front crankcase unit 31a of the left unit case 31L, although it is not shown in the drawing.

Figure 3:
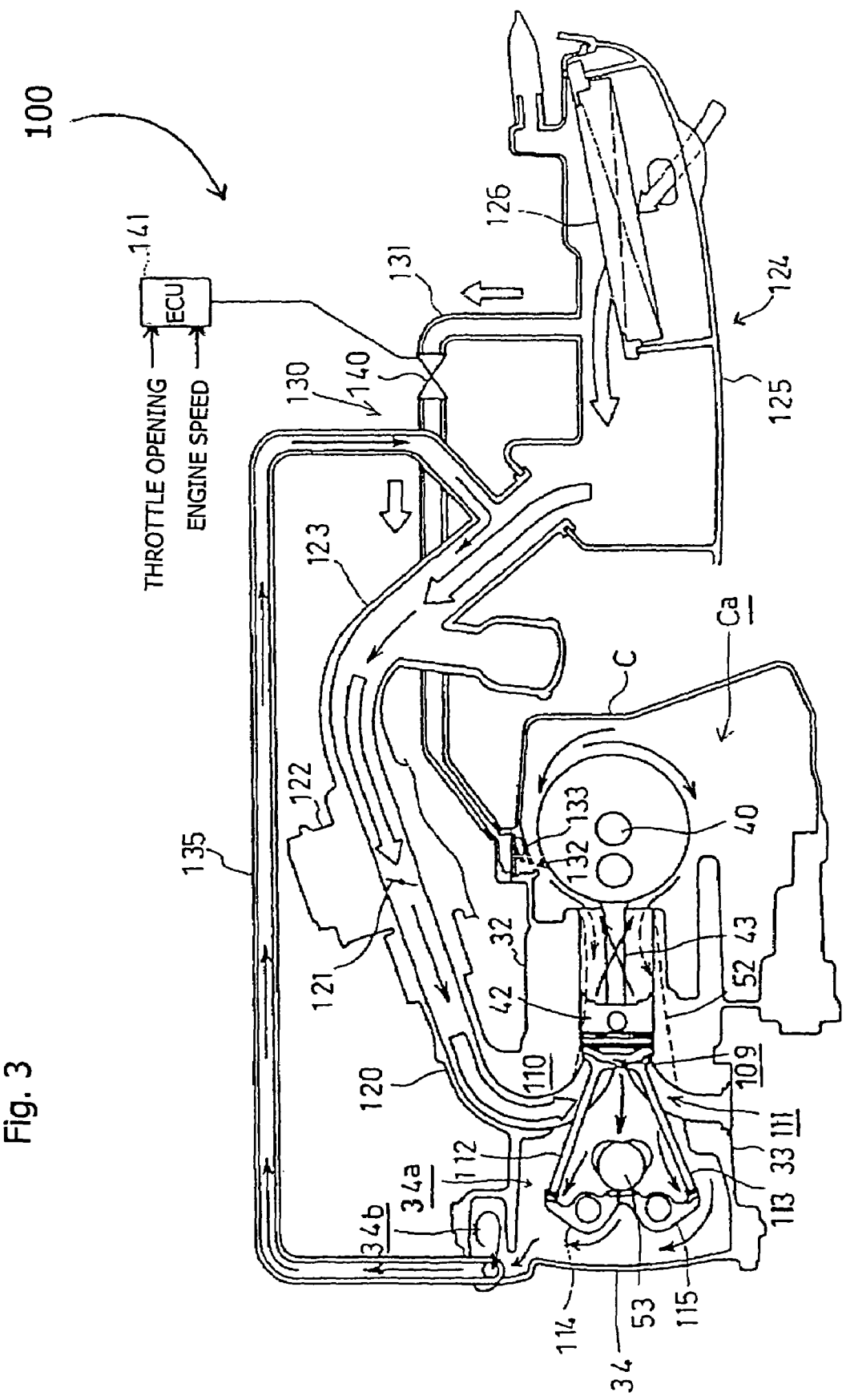
FIG. 3 is a schematic block diagram showing an internal combustion engine and the blowby control system according to the present invention.

FIG. 3 is a schematic block diagram showing the internal combustion engine 30 and a blowby control system 100 according to the present invention.

The internal combustion engine 30 has the cylinder head 33 formed with an air-intake port 110 and an exhaust port 111 opening into a combustion chamber 109. The cylinder head 33 is also provided with an air-intake valve 112 for controlling air flow through the air-intake port 110, and an exhaust valve 113 for controlling air flow through the exhaust port 111.

In a cylinder head cover 34, rocker arms 114, 115 for driving the air-intake valve 112 and the exhaust valve 113, respectively, are pivotally provided in contact with a corresponding cam of the camshaft 53.

As previously noted, the camshaft 53 and the crankshaft 40 are connected by a timing chain 51 provided in the timing chain chamber 52, which communicates between the valve chamber 34a and the crankshaft 40. The camshaft 53 is rotated at a rotatary speed half that of the crankshaft 6, so that the air-intake valve 112 and the exhaust valve 113 are opened and closed by a predetermined timing.

An air-intake pipe 120 extending from the air-intake port 110 of the cylinder head 33 of the internal combustion engine 30 is connected to the carburetor 122 provided with a throttle valve 121, and the carburetor 122 and an air cleaner 124 are connected by an intake air duct 123.

It is also possible to employ a fuel injection unit (not shown) instead of the carburetor 122. In that case, the throttle valve is positioned upstream of the fuel injection valve.

An exhaust pipe 28 extends downwardly from the exhaust port 111 and, as shown in FIG. 1, the exhaust pipe 28 extends along the lower surface of the crankcase C rearward and rightward to a muffler 29 disposed on the right side of the rear wheel 10.

The interior of an air cleaner case 125 of the air cleaner 124 is partitioned by an air cleaner element 126 into a clean side and a dirty side, and the intake air duct 123 is connected to the clean side downstream of the air cleaner element 126.

In the internal combustion engine 30 configured as described above, the crankcase C and the air cleaner case 125 are connected by a fresh air introducing channel 131, and this allows a crank chamber Ca and the clean side of the air cleaner 124 to be brought into communication.

The portion of the crankcase C where the fresh air introducing channel 131 is connected is formed with a narrowed portion 132 where the introducing area is narrowed.

A reed valve 133, which is a one-way valve for allowing air to be introduced from the air cleaner 124 to the crank chamber 2a and preventing air flow in the reverse direction, is provided at the narrowed portion 132 on the side of the fresh air introducing channel 131.

On the other hand, the cylinder head cover 34 and the upstream side of the intake air duct 123 on the downstream side of the air cleaner 124 are connected by a blowby gas return channel 135, so that the valve chamber 34a and the interior of intake air duct 123 are brought into communication with each other.

A solenoid valve 140 is interposed at a midsection of the fresh air introducing channel 131, and an electronic control unit ECU 141 of a microcomputer programmably controls operation of the solenoid valve 140.

The ECU 141 controls the solenoid valve 140 based on the instantaneous rotary speed NE of the internal combustion engine 30 and the throttle opening TH being supplied thereto by appropriately situated sensors in electronic communication therewith.

The solenoid valve 140 opens when energized, to allow air to flow through the fresh air introducing channel 131.

As described above, the blowby control system 100 is configured with the fresh air introducing channel 131 and the blowby gas return channel 135.

When the solenoid valve 140 is opened, variations in pressure of the crank chamber Ca brought about by pumping of the piston 42 of the internal combustion engine 30 draws fresh air (see hollowed outline arrow in FIG. 3) from the air cleaner 124 into the crank chamber Ca, passing through the fresh air introducing channel 131 via the narrowed portion 132 and the reed valve 133.

Blowby gas (see a solid arrow in FIG. 3) in the crank chamber Ca is moved from the timing chain chamber 52 to the valve chamber 34a by being pushed out by drawn fresh air, then is moved from the valve chamber 34a to a breather chamber 34b, where it is separated into air and liquid. Then, it passes through the blowby gas return channel 135, is discharged to the downstream side of the air cleaner 124, and is drawn into the intake air duct 123, and mixed with incoming combustion air, by the negative pressure on the downstream side of the air cleaner 124, so that the crank chamber Ca is effectively ventilated.

When the solenoid valve 140 is closed, fresh air is blocked from entering into the crank chamber Ca via the fresh air introducing channel 131. Therefore, the interior of the crank chamber Ca is not ventilated compulsorily, and hence discharge of blowby gas is restrained.

Referring now to a control map in FIG. 4 and a flowchart in FIG. 5, opening and closing control of the solenoid valve 140 done by the ECU 41 will be described below.

Figure 4:
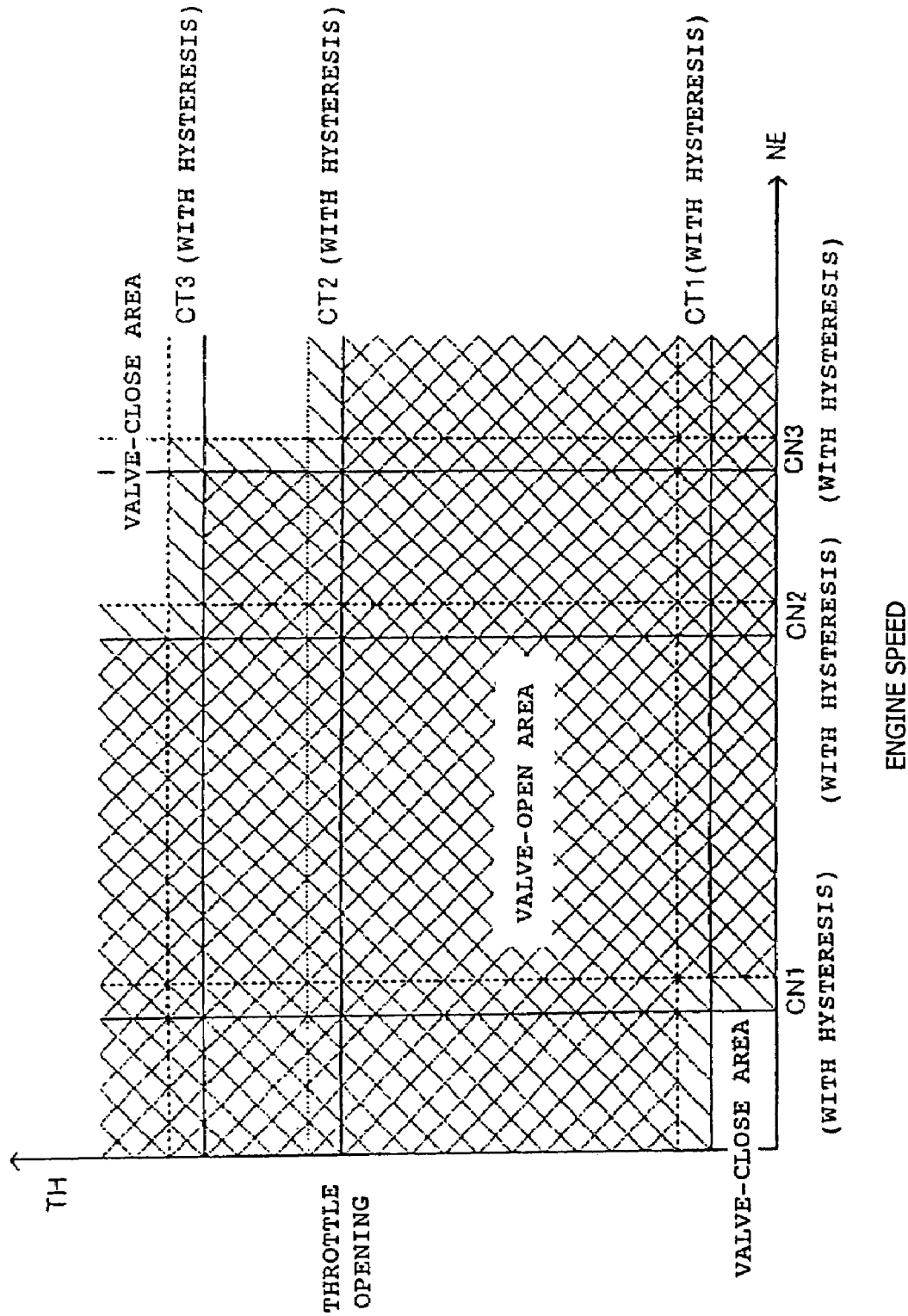
FIG. 4 is a control map of a solenoid valve.
Figure 5:
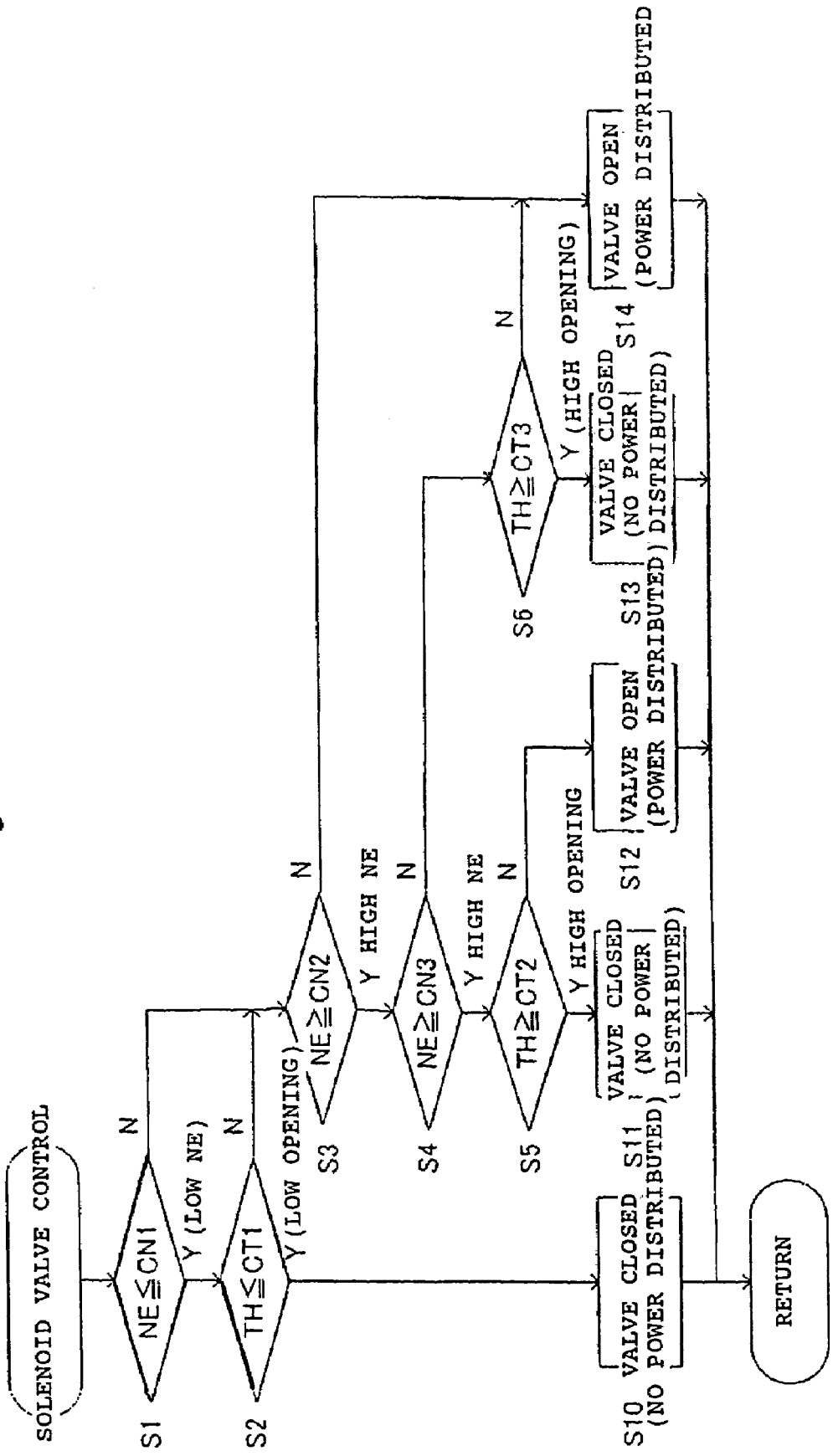
FIG. 5 is a flowchart showing a control procedure of the solenoid valve.

FIG. 4 is a control map stored in a memory of the ECU 41, which is a two-dimensional coordinate map with the lateral axis representing the engine speed NE and the vertical axis representing the throttle opening TH.

A cross-hatched area at the center is a valve-open area in which the solenoid valve 140 receives power distribution and hence is opened, and areas in which the values of the engine speed NE and the throttle opening TH are small, and the areas in which they are large are the valve-closed area in which the solenoid valve 140 does not receive the power distribution and hence is closed.

There are boundary areas (hatched area in FIG. 4) interposed between two boundaries in the valve-open area and the valve-close area, and the hysteresis control of switching between open and closed states of the solenoid valve 140 in these areas is implemented.

In other words, when the state of the engine speed NE and the throttle opening TH moves through the boundary area, switching between open and closed states is performed by the boundary, which is further in the direction of movement.

The valve-close area in which the engine speed NE and the throttle opening TH are small is defined by the first boundary rotation number CN1 and the first boundary opening CT1, and the first boundary rotation number CN1 and the first boundary opening CT1 include two boundary values with hysteresis, respectively.

The valve-close area in which both of the engine speed NE and the throttle opening TH are large is specified by the second boundary rotation number CN2, the third boundary rotation number CN3 (>CN2), and the second boundary opening CT2, the third boundary opening CT3 (>CT2), and the second boundary rotation number CN2, the third boundary rotation number CN3, the second boundary opening CT2, and the third boundary opening CT3 include two boundary values with hysteresis, respectively.

The first boundary rotation number CN1 of the engine speed NE is substantially the same as the engine speed n, at which the centrifugal clutch 91 as a drive clutch is connected or disconnected, the boundary value CN1u on the higher side of the first boundary rotation number CN1 is larger than the engine speed n, and the boundary value CN 1l on the lower side of the first boundary rotation number CN1 is smaller than the engine speed NE.

In other words, those values are set so that the relation of CN 1l<n<CN1u is satisfied.

The first boundary opening CT1 of the throttle opening TH is a throttle opening which prevents the solenoid valve 140 from opening until the output of the engine increases by the throttle operation after starting and the engine speed NE reaches the engine speed n at which the centrifugal clutch 91 is connected.

The second boundary rotation number CN2, the third boundary rotation number CN3, the second boundary opening CT2, and the third boundary opening CT3 define the boundaries at which increase in blowby gas due to the high engine speed NE is promoted more than necessary.

The second boundary rotation number CN2 is a engine speed corresponding to the shift transmission area when the belt-type stepless transmission 35 is in the accelerating state, and the third boundary rotation number CN3 is a engine speed at which the maximum output can be obtained.

The second boundary opening CT2 corresponds to the opening which is about 70% of the fully opened throttle opening, and the third boundary opening CT3 corresponds to substantially the fully opened state.

Referring now to a flowchart in FIG. 5, a control procedure implemented based on the control map described above will be described.

In a first place, whether or not the engine speed NE is equal to or exceeds the first boundary rotation number CN1 is determined (Step 1). When NE≦CN1, the procedure goes to Step 2, and when NE>CN1, the procedure jumps to Step 3.

The first boundary rotation number CN1 in this case is with hysteresis having the lower boundary value CN1l and the higher boundary value CN1u, and the boundary value at which the previous state of the solenoid valve 140 is maintained for a longer time becomes a reference value.

In other words, when the solenoid valve 140 was in the valve-close state previously, the higher boundary value CN1u becomes a reference value, and when it was in the valve-open state previously, the lower boundary value CN1l becomes a reference value.

In the determination steps 2, 3, 4, 5 and 6, described later, the hysteresis control is implemented in the same manner, and hence detailed description for each step is omitted.

When it is determined that NE≦CN1 in Step 1 and the procedure goes to Step 2, whether or not the throttle opening TH is equal to or exceeds the first boundary opening CT 1 is determined.

When it is determined that TH≦CT1, the procedure goes to Step 10, where the solenoid valve 140 does not receive the power distribution and hence is brought into the closed state.

In other words, when the engine speed NE does not exceed the first boundary revolving number CN1 (NE≦CN1), and the throttle opening TH does not exceed the first boundary opening CT1 (TH≦CT1), the solenoid valve 140 is closed and the fresh air introducing channel 131 is blocked.

After having started the internal combustion engine 30 and before the centrifugal clutch 91 is connected and hence the vehicle V starts traveling, the solenoid valve 140 is closed to block the fresh air introducing channel 131. Therefore, the blowby gas is prevented from being drawn into the combustion chamber 109 more than necessary even when the air-intake negative pressure is large, and hence combustion is hardly affected by the blowby gas. Consequently, variations in the engine speed are avoided and the ride quality may be improved.

The valve-close area of the solenoid valve 140 includes an idling state after having started the internal combustion engine 30, and hence variations in the number of idling rotation are prevented by closing the solenoid valve 140.

When it is determined to be NE>CN1 in Step 1 or when it is determined to be TH>CT1 in step 2, the procedure jumps to Step 3, where whether or not the engine speed NE is equal to or exceeds the second boundary rotation number CN2 is determined. When it is determined to be NE≧CN2, the procedure goes to Step 4. When it is determined to be NE<CN2, the procedure jumps to Step 14, where power is distributed to the solenoid valve 140 to bring it to the opened state.

When the engine speed NE is transferred from the valve-close area of NE≦CN1 to the valve-open area of CN1<NE<CN2, power is distributed to the solenoid valve 140 to open the same at the timing when the value exceeds the boundary value CN1u, which is the reference value on the higher side of the first boundary rotation number CN1, which is larger than the engine speed n at which the centrifugal clutch 91 is connected as described above.

Therefore, power is distributed to the solenoid valve 140 to open the same in a state in which the centrifugal clutch 91 is connected at the timing when the vehicle V starts traveling. Therefore, as described above, the solenoid valve 140 is closed to block the fresh air introducing channel 131 before the centrifugal clutch 91 is connected, and hence blowby gas is prevented from being drawn into the combustion chamber 109 more than necessary, and variations in the engine speed can be reduced.

After power is distributed to the solenoid valve 140 to open the same in the state of connecting centrifugal clutch 91, the engine speed is increased into the traveling state, where combustion is hardly affected by the blowby gas, and hence the engine speed is controlled without variations.

In contrast, when the engine speed NE is transferred from the valve-open area of CN1<NE<CN2 to the valve-close area of NE≦CN1, power distribution to the solenoid valve 140 is stopped to close the same at the timing when the value underruns the boundary value CN1l, which is the reference value on the lower side of the first boundary rotation number CN1, which is smaller than the engine speed n at which the centrifugal clutch 91 is disconnected as described above.

Therefore, by utilizing the reducing effect of variations in the engine speed by the inertia force of the crankshaft 40 after having disconnected the centrifugal clutch 91 and preventing the ride quality from deteriorating, and by performing air ventilation in the crankcase until the engine speed is reduced to the lower boundary value CN 1l of the first boundary rotation number CN1, the reduction capability of the blowby gas is improved.

When the engine speed NE is determined to be the second boundary rotation number CN2 (NE≧CN2) in Step 3, and the procedure goes to the step 4, whether or not the engine speed NE is equal to or exceeds the third boundary rotation number CN3 is determined. If NE≧CN3 is satisfied, the procedure goes to Step 5, where whether or not the throttle opening TH is equal to or exceeds the second boundary opening CT2 is determined. If TH≧CT2 is satisfied, the procedure goes to Step 11, where power distribution to the solenoid valve 140 is stopped to close the solenoid valve 140, and if TH<CT2 is satisfied, the procedure goes to Step 12, where power is distributed to the solenoid valve 140 to open the same.

When it is determined to be NE<CN3 in Step 4, the procedure goes to Step 6, and whether or not the throttle opening TH is equal to or exceeds the third boundary opening CT3 is determined.

If TH≧CT3, the procedure goes to Step 13 where power distribution to the solenoid valve 140 is stopped to close the same, and if TH<CT3, the procedure goes to Step 14, where power is distributed to the solenoid valve 140 to open the same.

In this manner, in the operating area in which the engine speed NE is large and the throttle opening TH is also large, it is controlled in such a manner that power distribution to the solenoid valve 140 is stopped to close the same so that the fresh air introducing channel 131 is blocked, whereby increase in blowby gas in the crankcase C due to high-rotation is prevented from being promoted.

Since the solenoid valve 140 is adapted to open when power is distributed thereto, when in the idling state after having started the engine, it is closed without being distributed with power, and hence power load of the solenoid is prevented, thereby reducing the engine friction in association with power generation.

In the present embodiment, the solenoid valve 140 is provided in the fresh air introducing channel 131. However, it is also possible to provide the solenoid valve in the blowby gas return channel 135 and implement the same control.

Also, the vehicle V of the present invention employs the centrifugal clutch 91 as the drive clutch so as to be connected and disconnected automatically, based on the engine speed. However, the blowby control system and method of the present invention can be applied to a vehicle in which the clutch is operated manually.

Although the present invention has been described herein with respect to a number of specific illustrative embodiments, the foregoing description is intended to illustrate, rather than to limit the invention. Those skilled in the art will realize that many modifications of the preferred embodiment could be made which would be operable. All such modifications, which are within the scope of the claims, are intended to be within the scope and spirit of the present invention.

We claim:

1. In an internal combustion engine configured to be mounted to a vehicle having a drive clutch, wherein the engine comprises a crankcase and an air-intake system, the improvement comprising a blowby gas control system for the engine, said blowby gas control system comprising:
   a fresh air introducing channel for introducing fresh air into the crankcase;
   a blowby gas return channel for returning blowby gas from the crankcase to the air-intake system;
   a blowby control valve provided in the fresh air introducing channel or the blowby gas returning channel for selectively restricting gas flow through the channel, the blowby control valve having an opened state and a closed state; and
   a controller for controlling operation of the blowby control valve, said controller being in electronic communication with the blowby control valve;
   wherein the controller is programmed to switch the blowby control valve from the closed state to the opened state, with the drive clutch engaged, when the vehicle starts traveling.

2. A blowby gas control system for an internal combustion engine according to claim 1, wherein the controller is operable to determine the engaged state of the drive clutch based on the rotary speed of the engine.

3. A blowby gas control system for an internal combustion engine according to claim 2, wherein the controller is operable to perform hysteresis control, by opening the blowby control valve at a slower engine speed than the engine speed at which the blowby control valve is closed.

4. A blowby gas control system for an internal combustion engine according to claim 1, wherein the blowby control valve comprises a solenoid which opens when energized.

5. A blowby gas control system for an internal combustion engine according to claim 4, wherein the controller is operable to close the solenoid valve when the engine speed exceeds a specified rate.

6. A blowby gas control system for an internal combustion engine according to claim 1, wherein a one-way valve is provided in the fresh air introducing channel to ventilate the crankcase in response to variations in crankcase pressure.

7. The blowby gas control system of claim 6, wherein the one-way valve is a reed valve.

8. The blowby gas control system of claim 1, wherein the blowby control valve is provided in the fresh air channel.

9. A method of controlling blowby gas routing in an internal combustion engine in a vehicle having a drive clutch and an electronic controller, said engine comprising:
   a crankcase;
   an air-intake system;

a fresh air introducing channel for introducing fresh air into the crankcase;

a blowby gas return channel for returning blowby gas from the crankcase to the air-intake system;

a blowby control valve provided in the fresh air introducing channel or the blowby gas returning channel for selectively restricting gas flow through the channel, the blowby control valve having an opened state and a closed state;

wherein the controller is operable to control operation of the blowby control valve, and wherein the method comprises the steps of closing the blowby control valve when the vehicle is stopped with the engine running, and opening the blowby control valve, with the drive clutch engaged, when the vehicle starts traveling.

10. The method of claim 9, wherein the controller receives information regarding engine speed, and wherein the controller determines the engaged or disengaged state of the drive clutch based on the speed of the engine.

11. The method of claim 9, wherein the controller performs hysteresis control by opening the blowby control valve at a slower engine speed than the engine speed at which the blowby control valve is closed.

12. The method of claim 9, wherein the controller opens the blowby control valve by energizing a solenoid.

13. The method of claim 9, wherein the controller closes the solenoid valve when the engine speed exceeds a specified rate.

14. The method of claim 9, further comprising a step of ventilating the crankcase in response to variations in crankcase pressure, via the operation of a one-way valve in the fresh air introducing channel.

* * * * *